United States Patent
Fyke et al.

(10) Patent No.: US 9,641,992 B2
(45) Date of Patent: *May 2, 2017

(54) METHODS AND DEVICES FOR DISTRIBUTING CONTENT TO AN ELECTRONIC DEVICE

(71) Applicant: BlackBerry Limited, Waterloo (CA)

(72) Inventors: Steven Henry Fyke, Waterloo (CA); Hans Mathias Lewin, Rydebäck (SE); David Ryan Walker, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,931

(22) Filed: Jun. 1, 2015

(65) Prior Publication Data

US 2015/0264541 A1 Sep. 17, 2015

Related U.S. Application Data

(63) Continuation of application No. 13/635,284, filed as application No. PCT/IB2012/050367 on Jan. 26, 2012, now Pat. No. 9,049,577.

(51) Int. Cl.
*H04W 4/18* (2009.01)
*G06F 21/30* (2013.01)
(Continued)

(52) U.S. Cl.
CPC .......... *H04W 4/18* (2013.01); *G06F 21/305* (2013.01); *H04W 8/24* (2013.01); *H04W 88/02* (2013.01)

(58) Field of Classification Search
CPC .................. H04W 4/18; G06F 21/00
(Continued)

(56) References Cited

U.S. PATENT DOCUMENTS

2003/0048174 A1  3/2003  Stevens et al.
2005/0037736 A1*  2/2005  Jung ............... G06F 21/305
                                                    455/411
(Continued)

FOREIGN PATENT DOCUMENTS

CN  101057225 A  5/2006
CN  103141723 A  11/2006
(Continued)

OTHER PUBLICATIONS

International Searching Authority, International Search Report and Written Opinion issued in International application No. PCT/IB2012/050367, dated Aug. 3, 2012, 9 pages.
(Continued)

*Primary Examiner* — John J Lee
(74) *Attorney, Agent, or Firm* — Rowand LLP

(57) ABSTRACT

Methods and devices for distributing and receiving content are provided. In one example aspect, a method comprises: receiving a command on a first electronic device to output content at an output device associated with a second electronic device; and in response to receiving the command to output content at the output device associated with the second electronic device: providing content access information from the first electronic device to the second electronic device, and adjusting a security state on the second electronic device.

17 Claims, 7 Drawing Sheets

(51) Int. Cl.
*H04W 8/24* (2009.01)
*H04W 88/02* (2009.01)

(58) Field of Classification Search
USPC ......... 455/41.2, 452.1, 411, 418, 410, 67.11, 455/454, 459, 515, 3.01, 3.05; 370/389, 370/392
See application file for complete search history.

(56) References Cited

U.S. PATENT DOCUMENTS

| | | | |
|---|---|---|---|
| 2006/0224882 A1 | 10/2006 | Chin | |
| 2006/0262785 A1* | 11/2006 | Duggal | H04L 67/04 370/389 |
| 2007/0162963 A1 | 7/2007 | Penet et al. | |
| 2010/0251358 A1 | 9/2010 | Kobayashi | |

FOREIGN PATENT DOCUMENTS

| | | |
|---|---|---|
| EP | 1507425 | 2/2005 |
| WO | 2006127543 | 11/2006 |

OTHER PUBLICATIONS

Lalit Indoria, How to Turn on your PC Using Your Android Phone, Blogotech.com, Jun. 13, 2011, http://www.blogotechblog.com/2011/06/wake-up-your-pc-using-android-phone/, retrieved Nov. 30, 2011, 3 pages.

Jessika Toothman, How Bluetooth Car Stereos Work, Howstuffworks.com, http://electronics.howstuffworks.com/gadgets/automotive/bluetooth-car-stereo1.htm, retrieved Nov. 30, 2011, 2 pages.

Rihan Handani, What is iCloud? Simple to Use and Simple to Set Up, TCGeeks.com, Oct. 5, 2011, http://www.tcgeeks.com/what-is-icloud-ipad-getting-started/, retrieved Nov. 30, 2011, 5 pages.

Apple.com, What is iCloud?, http://www.apple.com/icloud/, Retrieved Nov. 30, 2011, 2 pages.

Dieter Bohn, Android Ice Cream Sandwich to feature 'Face Unlock', Oct. 18, 2011, http://www.theverge.com/2011/10/18/android-ice-cream-sandwich-feature-face-unlock/, retrieved Nov. 30, 2011, 7 pages.

* cited by examiner

METHODS AND DEVICES FOR DISTRIBUTING CONTENT TO AN ELECTRONIC DEVICE

The present application is a continuation application of U.S. application Ser. No. 13/635,284 filed Sep. 14, 2012 which was a national stage entry of PCT/IB2012/050367 filed Jan. 26, 2012. The contents of these applications are incorporated herein by reference.

TECHNICAL FIELD

The present disclosure relates to content output and, more particularly, to methods and devices for facilitating the distribution of content to electronic devices.

BACKGROUND

Electronic devices are available in many different shapes and sizes, each of which may be best suited for a specific task or specific set of tasks. For example, laptop computers, smartphones, desktop computers, tablet computers may each have hardware and software which enables them to perform a specific task or a specific set of tasks. Due to hardware and software constraints, some of those electronic devices may not be capable or may not be best suited for performing a particular task. For example, since smart phones are generally designed to be highly portable, such electronic devices are often equipped with a small display and may, therefore, not be best suited for displaying video or images.

In some circumstances, a user may wish to access content but may find that the electronic device which they are using is poorly suited for accessing such content. Accordingly, users of electronic devices may sometimes have a poor user experience when accessing content at such electronic devices.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one example aspect, the present disclosure describes a method performed by a processor. The method includes: receiving a command (or instruction) on a first electronic device to output content at an output device associated with a second electronic device; and in response to receiving the command to output content at the output device associated with the second electronic device: providing content access information from the first electronic device to the second electronic device and adjusting a security state on the second electronic device.

In another example aspect, the present disclosure describes a first electronic device. The first electronic device includes a communication subsystem for communicating with a second electronic device and a processor. The first electronic device also includes a memory containing processor readable instructions for causing the processor to: receive a command (or instruction) to output content at an output device associated with a second electronic device; and in response to receiving the command to output content at output device associated with the second electronic device: provide content access information from the first electronic device to the second electronic device, and adjust a security state on the second electronic device.

In yet another example aspect, the present disclosure describes a method performed by a processor. The method includes: receiving, at a second electronic device, information sent from a first electronic device for outputting content at a output device associated with the second electronic device, the information including content access information; and in response to receiving the information sent from the first electronic device: adjusting a security state on the second electronic device, and outputting the content from an output device associated with the second electronic device.

In yet a further example aspect, the present disclosure describes a second electronic device. The second electronic device includes a communication subsystem for communicating with a first electronic device and an output interface associated with an output device. The second electronic device also includes a processor and a memory. The memory contains processor readable instructions for causing the processor to receive information for outputting content at an output device associated with the second electronic device, the information being received from a first electronic device, the information including content access information; and, in response to receiving the information sent from the electronic device: adjusting a security state on the second electronic device; and outputting the content from an output device associated with the second electronic device.

Other example embodiments of the present disclosure will be apparent to those of ordinary skill in the art from a review of the following detailed descriptions in conjunction with the drawings.

Example Content Sharing System

Figure 1:
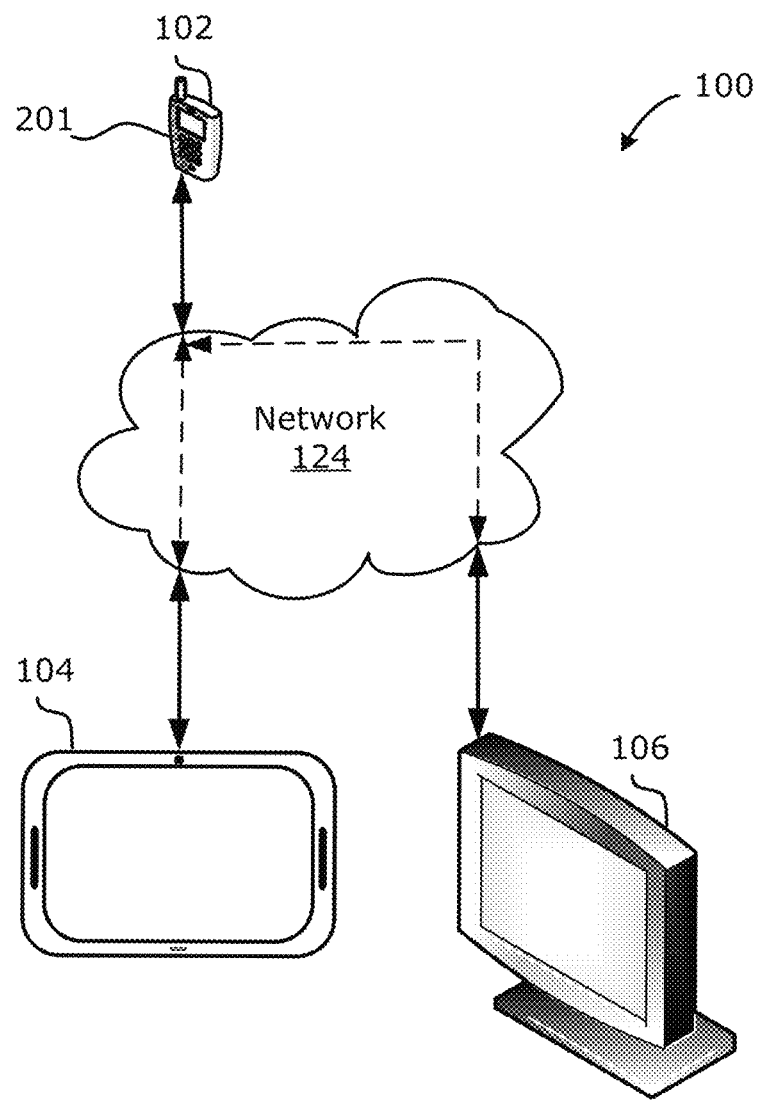
FIG. 1 is a block diagram of a content sharing system in accordance with example embodiments of the present disclosure.

Reference will now be made to FIG. 1 which illustrates an example content sharing system 100. The content system 100 is configured to allow a first electronic device 102 to cause a second electronic device 104 and/or a third electronic device 106 to output content. That is, a user may interact with the first electronic device 102 to cause content to be output from the second electronic device 104 and, in at least some example embodiments, the third electronic device 106.

In the example embodiments illustrated, the first electronic device 102 is a mobile communication device 201.

More specifically, in the example embodiment illustrated, the first electronic device 102 is a smartphone. However, in other example embodiments, the first electronic device 102 may take other forms. For example, in some example embodiments, the first electronic device 102 may be a tablet computer, a wearable computer such as a watch, a notebook, notepad or a laptop computer, a desktop computer, or a television. The first electronic device 102 may take other forms apart from those specifically listed herein.

Similarly, in the example embodiment illustrated, the second electronic device 104 is illustrated as a tablet computer. However, the second electronic device 104 may take other forms. By way of example, the second electronic device 104 may be a notebook, notepad or a laptop computer, a desktop computer, a wearable computer such as a watch, a television, or a mobile communication device.

Similarly, while the third electronic device 106 is illustrated as a television in the example embodiment of FIG. 1, the third electronic device may also take other forms. For example, the third electronic device 106 may be a mobile communication device, a wearable computer such as a watch, a tablet computer, a notebook, notepad or a laptop computer or desktop computer, or another electronic device not specifically listed herein.

The first electronic device 102 and the second electronic device 104 are communicatively connected to one another. That is, the first electronic device 102 and the second electronic device 104 are each equipped with one or more communication subsystems which allow these electronic devices to communicate with one another. In the example embodiment of FIG. 1, the first electronic device 102 and the second electronic device 104 communicate via a network 124 similarly, the first electronic device 102 is illustrated as communicating with the third electronic device 106 via the network 124. The network 124 may include a private network, and/or a public network, such as the Internet. For example, in some example embodiments, the first electronic device 102 and/or the second electronic device 104 are configured for Wi-Fi communications with respective network gateways.

In other example embodiments, the network 124 may not be utilized. Instead, the first electronic device 102 may connect to the second electronic device 104 and, in some example embodiments, the third electronic device 106 via a more direct connection. For example, in some example embodiments, the first electronic device 102 may connect directly to the second electronic device 104 via a Wi-Fi connection. Similarly, in at least some example embodiments, the first electronic device 102 may connect to the second electronic device 104 via a Bluetooth™ connection. Similarly, in at least some example embodiments, the first electronic device 102 may connect to the second electronic device 104 via a near field communication (NFC) connection. Accordingly, in at least some example embodiments, the first electronic device 102 may be configured to communicate with the second electronic device 104 via other short range communication technology. That is, a short range connection may be established between the first electronic device 102 and the second electronic device 104.

Accordingly, after a connection is established between the first electronic device 102 and the second electronic device 104, the first electronic device 102 may cause content to be output from an output device, such as a display, associated with the second electronic device 104. For example, a user receiving an email on the first electronic device 102 may command the first electronic device 102 to cause the second electronic device 104 to open the email, or an attachment in that email. That is, rather than simply displaying content at a display associated with the first electronic device 102, a user may be permitted to display the content or otherwise output the content using the second electronic device 104 and its associated output device.

As will be described in greater detail below with reference to FIG. 4, in at least some example embodiments, when the first electronic device 102 instructs the second electronic device 104 to output content at a display on the second electronic device 104, a security state on the second electronic device 104 may automatically be adjusted. For example, if the second electronic device 104 is currently in a locked state in which one or more features of the second electronic device 104 are not available without entry of a password or other authentication information, then the second electronic device 104 may be automatically unlocked. More particularly, in at least some example embodiments, if the first electronic device 102 and the second electronic device 104 have a pre-existing trusted relationship in which a user of the second electronic device 104 has indicated that the first electronic device 102 should be trusted, then, in response to receiving a command on the first electronic device 102 to output content at an output device associated with the second electronic device 104, the content will be output from the second electronic device 104 and, if the second electronic device 104 is in a higher level security state, such as a device locked state, then the second electronic device 104 may be placed in a lower level security state, such as a device unlocked state.

Example First Electronic Device

An overview having been provided, reference will now be made to FIG. 2, which illustrates an example first electronic device 102. In the illustrated example embodiment, the first electronic device 102 is a mobile communication device 201. In at least some example embodiments, the mobile communication device 201 is a two-way communication device having data and possibly voice communication capabilities, and the capability to communicate with other computer systems; for example, via the internet. Depending on the functionality provided by the first electronic device 102, in various example embodiments the first electronic device 102 may be a multi-mode communication device configured for both data and voice communication, a mobile telephone such as a smartphone, a tablet computer such as a slate computer, a wearable computer such as a watch, a PDA (personal digital assistant), a computer system such as a desktop, netbook, laptop, or notebook computer system, or a television.

A smartphone is a mobile phone which offers more advance computing capability than a basic non-smart cellular phone. For example, a smartphone may have the ability to run third party applications which are stored on the smartphone.

A tablet computer (which may also be referred to as a tablet) is an electronic device which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In other example embodiments, the first electronic device 102 may be of a type not specifically listed above.

Figure 2:
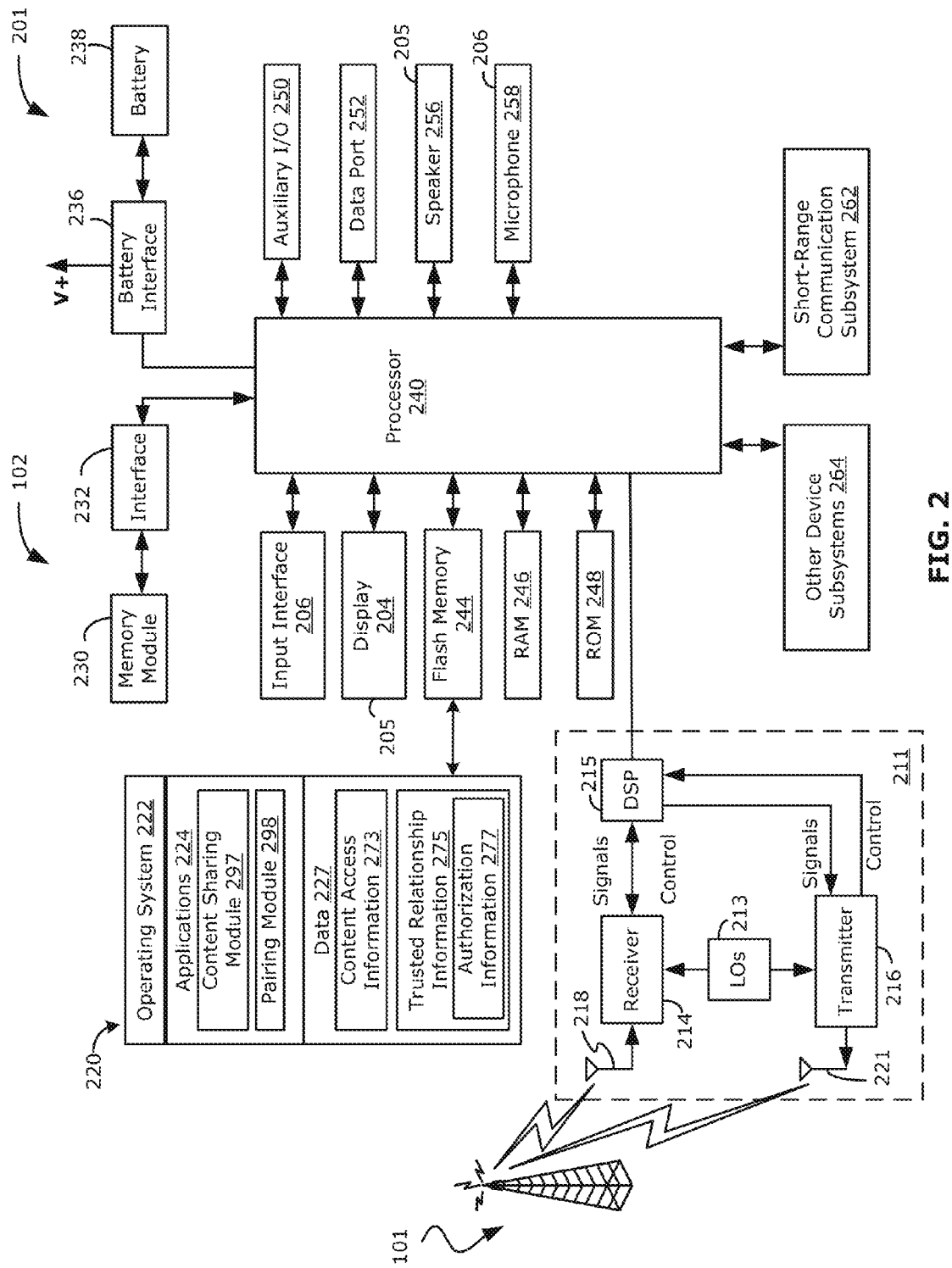
FIG. 2 is a block diagram of a first electronic device in accordance with example embodiments of the present disclosure.

The mobile communication device 201 of FIG. 2 includes a housing (not shown) which houses components of the mobile communication device 201. Internal components of the mobile communication device 201 may be constructed on a printed circuit board (PCB). The mobile communication device 201 includes a controller including at least one processor 240 (such as a microprocessor) which controls the overall operation of the mobile communication device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces 205), a short-range communication subsystem 262, and other device subsystems generally designated as 264. Some of the subsystems shown in FIG. 2 perform communication-related functions, whereas other subsystems may provide "resident" or on-device functions.

The mobile communication device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver 214 and transmitter 216, as is known in the art. The particular design of the wireless communication subsystem 211 depends on the wireless network 101 in which the mobile communication device 201 is intended to operate.

The mobile communication device 201 may communicate with any one of a plurality of fixed transceiver base stations of the wireless network 101 within its geographic coverage area. The mobile communication device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The mobile communication device 201 may include other wireless communication interfaces for communicating with other types of wireless networks; for example, a wireless network such as an orthogonal frequency division multiplexed (OFDM) network. The auxiliary I/O subsystems 250 may include a pointing or navigational tool (input device) such as a clickable trackball or scroll wheel or thumbwheel, or a vibrator for providing vibratory notifications in response to various events on the mobile communication device 201 such as receipt of an electronic message or incoming phone call, or for other purposes such as haptic feedback (touch feedback).

In some example embodiments, the mobile communication device 201 also includes a removable memory module 230 (typically including flash memory) and a memory module interface 232. Network access may be associated with a subscriber or user of the mobile communication device 201 via the memory module 230, which may be a Subscriber Identity Module (SIM) card for use in a GSM network or other type of memory module for use in the relevant wireless network type. The memory module 230 may be inserted in or connected to the memory module interface 232 of the mobile communication device 201.

The mobile communication device 201 may store data 227 in an erasable persistent memory, which in one example embodiment is the flash memory 244. In various example embodiments, the data 227 may include service data having information required by the mobile communication device 201 to establish and maintain communication with the wireless network 101. The data 227 may also include user application data such as email messages, address book and contact information, calendar and schedule information, notepad documents, image files, and other commonly stored user information stored on the mobile communication device 201 by its user, and other data. The data 227 may also include content access information 273, trusted relationship information 275 and/or authorization information 277.

As will be discussed in greater detail below, the content access information 273 may be information which may be used to access specific content. In some example embodiments, the content access information 273 may be a reference, such as a location, address or other identifier, which allows an electronic device to retrieve the content. By way of example, in at least some embodiments, the content access information 273 may be a link or pointer, such as a Uniform Resource Locator (URL) which specifies a location at which content may be retrieved. In at least some embodiments, the content may be a file, such as an audio file, video file, text file, document and/or multimedia file.

In at least some example embodiments, the data 227 may include content. That is, in at least some embodiments, the content may be stored on the memory of the first electronic device 102. In at least some example embodiments, the content may be defined by the content access information 273. That is, the content may be included in the content access information 273.

The trusted relationship information 275 may be information which allows the first electronic device 102 to connect to another electronic device, such as the second electronic device 104 (of FIG. 1). That is, the trusted relationship information may identify another electronic device which has a trusted relationship with the first electronic device 102. The trusted relationship information may be used to allow the first electronic device 102 to connect to the other electronic device 102. In at least some embodiments, the trusted relationship information 275 may be used by the first electronic device 102 to allow the first electronic device 102 to cause the other electronic device (which may be a second electronic device 104 (of FIG. 1)) to transition to a lower level security state.

In at least some example embodiments, the data 227 may include authorization information 277. The authorization information 277 may be private information which is known, available and/or interpretable by the first electronic device and/or the second electronic device but which is not publicly available (i.e. available to other non-trusted electronic devices). In at least some example embodiments, the authorization information may be used by the first electronic device 102 to permit the first electronic device 102 to cause the second electronic device 104 to unlock or otherwise transition to a lower level security mode. For example, when the first electronic device 102 wishes to unlock the second electronic device 104, it may provide the authorization information 277 to the second electronic device 104 to demonstrate to the second electronic device 104 that the first electronic device 102 has authority to unlock the second electronic device 104. The second electronic device 104 may authenticate the received authorization information 277 before unlocking itself.

The data 227 stored in the persistent memory (e.g. flash memory 244) of the mobile communication device 201 may be organized, at least partially, into a number of databases or data stores each containing data items of the same data type or associated with the same application. For example, email messages, contact records, and task items may be stored in individual databases within the mobile communication device 201 memory.

The data port 252 may be used for synchronization with a user's host computer system. The data port 252 enables a user to set preferences through an external device or software application and extends the capabilities of the mobile communication device 201 by providing for information or software downloads to the mobile communication device 201 other than through the wireless network 101. The alternate download path may for example, be used to load an encryption key onto the mobile communication device 201 through a direct, reliable and trusted connection to thereby provide secure device communication.

In some example embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 262 is an additional optional component which provides for communication between the mobile communication device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the mobile communication device 201 during or after manufacture. Additional applications and/or upgrades to an operating system 222 or software applications 224 may also be loaded onto the mobile communication device 201 through the wireless network 101, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the mobile communication device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the mobile communication device 201 may also compose data items, such as email messages; for example, using an input interface 206 in conjunction with the display 204. These composed items may be transmitted through the communication subsystem 211 over the wireless network 101.

In the voice communication mode, the mobile communication device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, a content sharing module 297 and/or a pairing module 298. In the example embodiment of FIG. 2, the content sharing module 297 and pairing module 298 are illustrated as being implemented as separate stand-alone applications 224, but in other example embodiments, one or more of these modules could be implemented as part of the operating system 222 or another application 224. Furthermore, the functions of the pairing module 298 and the content sharing module 297 could be provided by a single module.

The content sharing module 297 may be configured to allow the first electronic device 102 (which may be the mobile communication device 201) to cause content to be output from an output device associated with another electronic device (e.g. a second electronic device). That is, the content sharing module may be configured to share content with another electronic device. In at least some example embodiments, the content sharing module 297 may do so by sending the content access information 273 to the other electronic device.

In at least some example embodiments, when sharing such content with another electronic device, the content sharing module 297 may cause that other electronic device to transition to a lower level security mode. For example, if the other electronic device is operating in a device locked state in which one or more functions or features of that electronic device are locked, then the other electronic device may be automatically unlocked by the content sharing module 297. Functions and features of the content sharing module will be discussed in greater detail below with reference to FIG. 4 and FIG. 7.

The pairing module 298 may be configured to allow the first electronic device 102 to establish a trusted relationship with another electronic device, such as the second electronic device 104. More particularly, the pairing module 298 may perform a pairing routine during which a secure connection with another electronic device is established. During the pairing routine, the trusted relationship information 275 may be stored to memory of the first electronic device 102. The trusted relationship information 275 may include information which identifies the other electronic device. The trusted relationship information 275 may later be used to allow the first electronic device 102 to connect to the second electronic device 104 when the first electronic device 102 and the second electronic device 104 are in wireless communication range of one another. Functions and features of the pairing module 298 will be discussed in greater detail below with reference to FIG. 6.

The mobile communication device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Second Electronic Device

Figure 3:
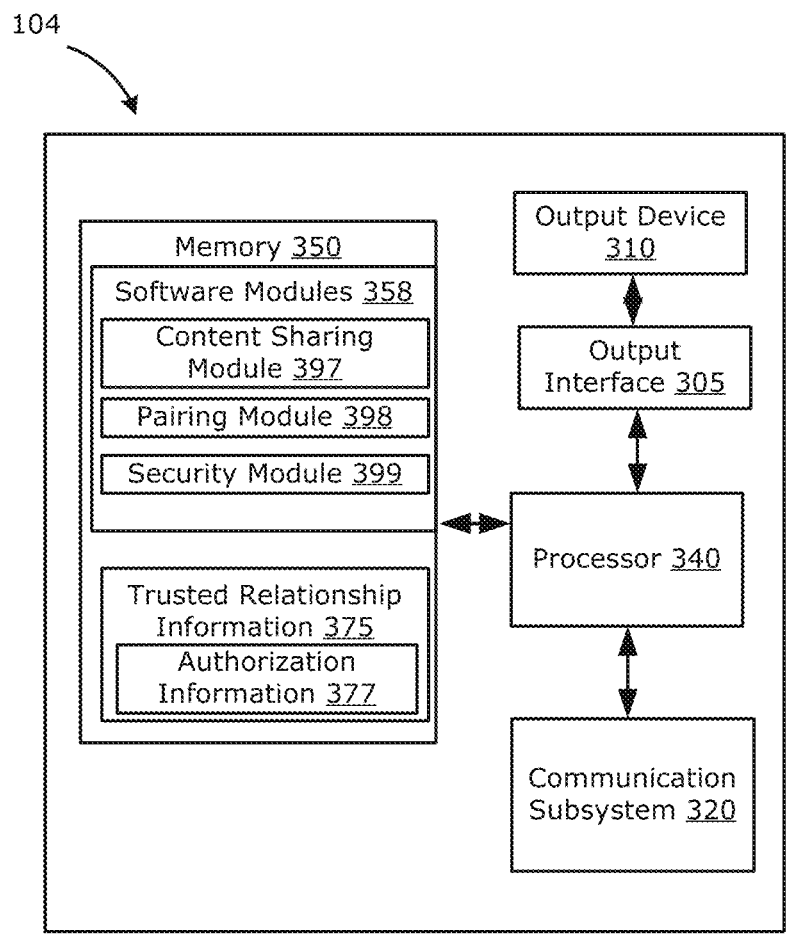
FIG. 3 is a block diagram of a second electronic device in accordance with example embodiments of the present disclosure.

Reference is now made to FIG. 3, which shows in block diagram for an example second electronic device 104. The second electronic device 104 is configured to accept a command (or instruction), from the first electronic device 102 (of FIGS. 1 to 2), to output content at an output device 310 associated with the second electronic device 104. In response to receiving such a command, the second electronic device 104 may output the content from the output device 310 associated with the second electronic device 104 and may also adjust security state on the second electronic device 104.

The second electronic device 104 may be of a variety of different types. For example, in some example embodiments, the second electronic device 104 is a tablet computer. In other example embodiments, the second electronic device 104 is a notebook, laptop, or netbook style computer. In yet further example embodiments, the second electronic device 104 is a mobile communication device 201 (of FIG. 2), such as a cellular phone, smartphone or other style mobile communication device. For example, in some example embodiments, the second electronic device 104 may be a mobile communication device 201 of the type described above with reference to FIG. 2. In yet further example embodiments, the second electronic device 104 may be a wearable computer, such as a watch. In some example embodiments, the second electronic device 104 may be a television. The second electronic device 104 may be of other types not specifically listed herein.

The second electronic device 104 includes a controller, including one or more processor 340 which controls the overall operation of the second electronic device 104. The second electronic device 104 may include a memory 350 which is communicatively connected to the processor 340. The memory 350 may be configured to provide data stored in the memory 350 to the processor 340. For example, the memory 350 may include processor readable instructions for causing the processor 340 to perform a method such as, for example, one or more of the methods described below with reference to FIGS. 5 and 6.

While the memory 350 is illustrated as a single component, it will typically include multiple memory components of various types. For example, the memory 350 may include random access memory (RAM), read only memory (ROM), a hard disk drive (HDD), a solid state drive (SSD), flash memory, or other types of memory. It will be appreciated that each of these various types of memory will be best suited for different purposes and applications.

The processor 340 may operate under stored program control and may execute software modules 358 stored on the memory 350. The software modules 358 may, in at least some example embodiments, included a pairing module 398. The pairing module 398 may be configured to allow the second electronic device 104 to establish a trusted relationship with the first electronic device 102. By way of example, in at least some example embodiments, the pairing module 398 is a Bluetooth™ pairing module, which executes a Bluetooth pairing algorithm. In at least some example embodiments, during the pairing algorithm performed by the pairing module 398, user authentication may be required at the second electronic device 104 and, in at least some example embodiments, at the first electronic device 102. That is, during the pairing algorithm which is performed by the pairing module 398, a user may be required to verify or confirm that a trusted relationship should be created between the first electronic device 102 and the second electronic device 104.

The pairing module 398 of the second electronic device 104 may, therefore, work together with a corresponding pairing module 298 (of FIG. 2) of the first electronic device 102. For example, in some example embodiments, one or more of the pairing modules 298, 398 of the first electronic device 102 and/or the second electronic device 104 may be configured to cause a display associated with that electronic device 102, 104 to display a pass code or password. In order to complete the pairing process, input of that pass code or password may be required on one or both of the first electronic device 102 or the second electronic device 104.

In at least some example embodiments, during the pairing process, the pairing module 398 may create and store trusted relationship information 375 in memory 350 of the second electronic device 104. The trusted relationship information 375 may identify the first electronic device 102 and may be used to allow the second electronic device 104 to remember that the first electronic device 102 is trusted by the second electronic device 104. That is, the trusted relationship information 375 may be used by the second electronic device 104 so that the second electronic device 104 is subsequently aware that a trusted relationship exists with the first electronic device 102. The storage of the trusted relationship information 375 may, in at least some example embodiments, allow the electronic devices 102, 104 to subsequently connect to one another. For example, in some example embodiments, after the trusted relationship is established through the pairing modules 398, 298 (of FIGS. 1 and 2), when the electronic devices 102, 104 are within range to communicate over a short range connection, such as a Bluetooth connection, the devices can automatically connect to one another to allow those devices to send data to and/or receive data from one another. That is, once a trusted relationship is established between the first electronic device 102 and the second electronic device 104 the saved trusted relationship information 375 allows those electronic devices to be automatically connected to one another at some time in the future.

An example method of establishing a trust relationship between the first electronic device 102 and the second electronic device 104 will be discussed in greater detail below with reference to FIG. 6. In at least some example embodiments, the pairing module 398 of the second electronic device 104 may cooperate with the pairing module 298 of the first electronic device 102 in order to perform the method 600 of FIG. 6. That is, in at least some example embodiments, the pairing modules 298 (of FIG. 2), 398 may contain processor readable instructions which, when executed by the processor 240, 340 of the respective devices, cause that processor 240, 340 to perform the method 600 of FIG. 6.

The software modules 358 may, in at least some example embodiments, include a security module 399. The security module 399 may, for example, be configured to control security states on the second electronic device 104. That is, the security module 399 may permit the second electronic device 104 to operate in multiple security states. For example, the security module 399 may permit the second electronic device 104 to selectively operate in a higher level security state and also in a relatively lower level security state.

In the higher level security state, one or more features of the second electronic device 104 may be disabled. That is, one or more features which are available on the second electronic device 104 when the second electronic device 104 is in the lower level security state may be unavailable when the second electronic device 104 is in the higher level security state. In some example embodiments, the higher level security state may be a device locked state. In some example embodiments, during the device locked state, many of the features of the second electronic device 104 may be disabled. For example, the second electronic device 104 may be prohibited from accessing one or more applications or data on the second electronic device 104 when the second electronic device 104 is in the device locked state. In example embodiment in which the higher level security state is a device locked state, the lower level security state may be a device unlocked state. In the device unlocked state, features which were locked from use in the device locked state may be available. For example, a user may be permitted to access applications or data which were unavailable during the device locked state.

The security module 399 may, in response to one or more predefined trigger conditions, adjust the security state on the second electronic device 104. For example, in some example embodiments, when the second electronic device 104 is operating in the higher level security state such as the device locked state, authentication information may be input into the second electronic device 104 to transition the second electronic device 104 from a higher level security state to a lower level security state. That is, the security module 399 may provide a graphical user interface or another interface which allows a user of the second electronic device 104 to input authentication information such as a user name, password, pass code, or other authentication information. In response to receiving such information, the security module 399 may authenticate the received information in order to ensure that the user is authorized to transition the second electronic device 104 to a lower level security state, such as a device unlocked state. For example, the second electronic device 104 may compare received authentication information to other authentication information (not shown) which may be stored in memory in a secure fashion. If the received authentication information matches the authentication information stored in memory, then the security module 399 may adjust the security state of the second electronic device 104. More particularly, the security module 399 may transition the second electronic device 104 to a lower level security state, such as a device unlocked state.

The software modules 358 may, in at least some example embodiments, include a content sharing module 397. The content sharing module 397 may be configured to receive information, such as commands, from trusted electronic devices. For example, the content sharing module 397 may be configured to receive information from the first electronic device 102. More particularly, the content sharing module 397 of the second electronic device 104 may be configured to receive information, sent from a first electronic device 102, for outputting content at the second electronic device 104. In at least some example embodiments, the received information may be an instruction which instructs the second electronic device 104 to output specified content to an output device 310 associated with that second electronic device 104. In some example embodiments, the information received from the first electronic device 102 may include content access information 273 (of FIG. 2). The content access information 273 may, for example, be a reference to the content which the first electronic device 102 would like the second electronic device 104 to output. For example, the reference may be a uniform resource locator (URL) or another link, pointer, or identifier which informs the content sharing module 397 of the specific content which is to be displayed. In response to receiving such a reference, the content sharing module 397 may retrieve the specified content using the reference and may automatically output the content to an output device 310 associated with the second electronic device 104. For example, in some example embodiments, the content may be displayed on a display associated with the second electronic device 104.

In some example embodiments, rather than simply sending a reference (such as a link, pointer, or other identifier) to the content, the first electronic device 102 may send the second electronic device 104 content access information 273 (of FIG. 2) which includes the content itself. That is, the first electronic device 102 may transmit content to the second electronic device 104 and the content may be received at the second electronic device 104. In response to receiving the content, the content sharing module 397 may cause the received content to be output to an output device 310 associated with the second electronic device 104. The content sharing module 397 will be described in greater detail below with reference to FIG. 5.

The content in which the first electronic device 102 effectively instructs the second electronic device 104 to display, play, access, or otherwise output may, for example, be an electronic message, a webpage, an electronic document containing text, audio, video, an image, or an email attachment. For example, in some example embodiments the content may be an attachment from an email, the body or content of an email, a webpage which is available through the internet, a music file, a video file such as a movie, a portable document format (PDF) file, a Microsoft Word™ file or another word processing file, an application such as a game, or other types of content not specifically listed herein. In at least some example embodiments, the content may be referred to as digital content.

In at least some example embodiments, in order to output the content at the output device 310, the second electronic device 104 may be configured to load the content within an associated application which is configured for handling such content. That is, in at least some example embodiments, in response to receiving content access information 273 (FIG. 2) which effectively instructs the second electronic device 104 to output specified content, the second electronic device 104 may automatically launch an application which is configured for outputting such content and may automatically load the specified content in that application. For example, where the content is a video, a video player application may be launched on the second electronic device 104 and the video may be loaded into the video player application.

In at least some example embodiments, when a first electronic device 102, which has a trusted relationship with the second electronic device 104, instructs the second electronic device 104 to output specified content at an output device 310 associated with the second electronic device 104, then the second electronic device 104 may automatically adjust a security state. That is, when the first electronic device 102 instructs or commands the second electronic device 104 to output content (for example, when the first electronic device 102 sends the second electronic device 104 content access information 273 (of FIG. 2) which effectively instructs the second electronic device 104 to output the specified content), if the second electronic device 104 is currently operating in a higher level security state such as a device locked state, it may automatically transition to a lower level security state, such as a device unlocked state. That is, the fact that a user of a trusted device (i.e. the first electronic device 102) wishes to use the output resources of the second electronic device 104 may be treated as implicit authorization to adjust a security state on the electronic device; for example, by unlocking the second electronic device 104.

Accordingly, when a user commands the first electronic device 102 to output content at the second electronic device 104, if the second electronic device 104 is in a higher level security state, it is automatically transitioned to a lower level security state. That is, in at least some example embodiments, a user is not required to input their authentication information on either the first electronic device 102 or the second electronic device 104 to unlock the second electronic device 104. A command which is received at an unlocked first electronic device 102 and which instructs the first electronic device 102 to cause a second electronic device 104 to output content may effectively be treated as a command to unlock the second electronic device 104 (i.e. to transition the second electronic device 104 to a lower level security state) if the first electronic device 102 and the second electronic device 104 have a pre-existing trusted relationship.

Accordingly, in at least some example embodiments, the content sharing module 397 and/or the security module 399 may cause the second electronic device 104 to transition to a lower level security state in response to receiving an instruction to output content from a first electronic device 102 which has a trusted relationship with the second electronic device 104.

In some example embodiments, in order to securely unlock the second electronic device 104 by command from the first electronic device 102, the first electronic device 102 and the second electronic device 104 may each store authorization information 277 (of FIG. 2), 377. In at least some example embodiments, the authorization information 377 may be the same authentication information which is used by the security module 399 as a password or pass code and which may be input by a user of the second electronic device 104 directly into the second electronic device 104 to unlock the second electronic device 104. In some example embodiments, the authorization information 377 may be created during a pairing process, which is performed by the pairing module 398. That is, the authorization information 377 may be part of the trusted relationship information 375 which is created when the devices are paired with one another.

In some example embodiments, the first electronic device 102 may effectively adjust the security state on the second electronic device 104 by sending the authorization information from the first electronic device 102 to the second electronic device 104. The authorization information may be secure information for authorizing the second electronic device 104 to adjust its security state. The second electronic device 104 may, upon receiving the authorization information 277, compare the received authorization information to its own authorization information 377 which is stored in memory 350. If the authorization information is received from the first electronic device 102 corresponds to the authorization information which is included in the memory 350 then the second electronic device 104 may adjust the security state of the second electronic device 104 if the second electronic device 104 is currently operating in the higher level security state. That is, if this criterion is met, then the second electronic device 104 may transition to the lower level security state (e.g. the device unlocked state).

Functions and features of the content sharing module 297 will be discussed in greater detail below with reference to FIG. 5.

The memory 350 may also store other data not specifically referred to herein.

The second electronic device 104 may include one or more output interfaces 305 which are configured to interact with one or more output devices 310. The output interface 305 may be controlled by the processor 340. In some example embodiments, one or more of the output devices 310 of the second electronic device 104 may be a display. For example, the display may, in at least some example embodiments, be a liquid crystal display (LCD). In other example embodiments, the display may be a light emitting diode (LED) display. In at least some example embodiments, the display may be a touch screen display which is configured to display content and also to receive input via a touch sensitive overlay. Other types of displays may be used in other example embodiments. Accordingly, in example embodiments in which the output devices 310 include a display, one or more of the output interfaces 305 of the second electronic device 104 may be a display interface. By way of example, the display interface may be a video card. The display interface may control output to the display. For example, the display interface may create video signals which are capable of being processed by the display.

In at least some example embodiments, the second electronic device 104 may include an audio based output interface 305 which is connected to an audio based output device 310, such as a speaker. That is, in at least some example embodiments, the second electronic device 104 may be equipped to output audio through one or more speakers. Other types of output devices 310 and output interfaces 305 may be utilized in other example embodiments.

The second electronic device 104 may include one or more communication subsystems 320 for communicating with other systems, servers, or electronic devices. For example, a communication subsystem 320 may be provided on the second electronic device 104 to allow the second electronic device 104 to communicate with the first electronic device 102. As described above with reference to FIG. 1, in some example embodiments, the second electronic device 104 may communicate with the first electronic device 102 via a network 124 (of FIG. 1). In other example embodiments, the communication subsystem 320 may allow the second electronic device 104 to communicate more directly with the first electronic device 102. That is, in at least some example embodiments, the first electronic device 102 and the second electronic device 104 may communicate with one another through a direct connection such as a direct wireless connection. In at least some example embodiments, the communication subsystem 320 may be a wireless communication interface such as Wi-Fi or Bluetooth or may be a communication subsystem 320 which is configured to communicate via wired communications, such as Ethernet communications. The communication subsystem 320 may take other forms apart from those specifically listed herein.

The second electronic device 104 may include other features, components, or subsystems apart from those specifically discussed herein. By way of example, the second electronic device 104 will include a power subsystem which interfaces with a power source for providing electrical power to the second electronic device 104 and its components. By way of further example, the second electronic device 104 may include one or more input devices. The input devices may include a navigational input device and/or an alpha numeric input device. By way of further example the input devices may include a mouse, a track pad, a track ball, a touch screen overlay, or another input device not specifically listed herein. In at least some example embodiments, the input device may be used for the input of authentication information which may be used by the security module 399 to transition the second electronic device 104 from a higher level security state (e.g. a device locked state) to a lower level security state (e.g. a device unlocked state). For example, the input device may be used to input a password to unlock a locked second electronic device 104.

The software modules 358 may be logically or physically organized in a manner that is different than the manner illustrated in FIG. 3. By way of example, the features described herein with reference to the content sharing module 397, the pairing module 398, and/or the security module 399 may be divided or combined into a greater number or lesser number of software modules. For example, functions which are described with reference to a single software application or module may be provided by a plurality of software applications or modules. Similarly, functions which are described with reference to multiple software applications or modules may be provided by a single software application or module. In some example embodiments, the features of one or more of the content sharing module 397, the pairing module 398, or the security module 399 may be provided by an operating system which controls operations on the second electronic device 104. Similarly, in at least some example embodiments, the functions of two or more of these modules may be combined into a single module. Thus, the software modules 358 described with reference to FIG. 3 represent one possible assignment of features to software modules. However, such features may be organized in other ways in other example embodiments.

Furthermore, the second electronic device 104 may include other software applications or modules which provide features which are not specifically discussed herein. For example, the second electronic device 104 may include operating system software which controls the overall operation of the second electronic device 104.

Example Method for Distributing Content to an Electronic Device

Figure 4:
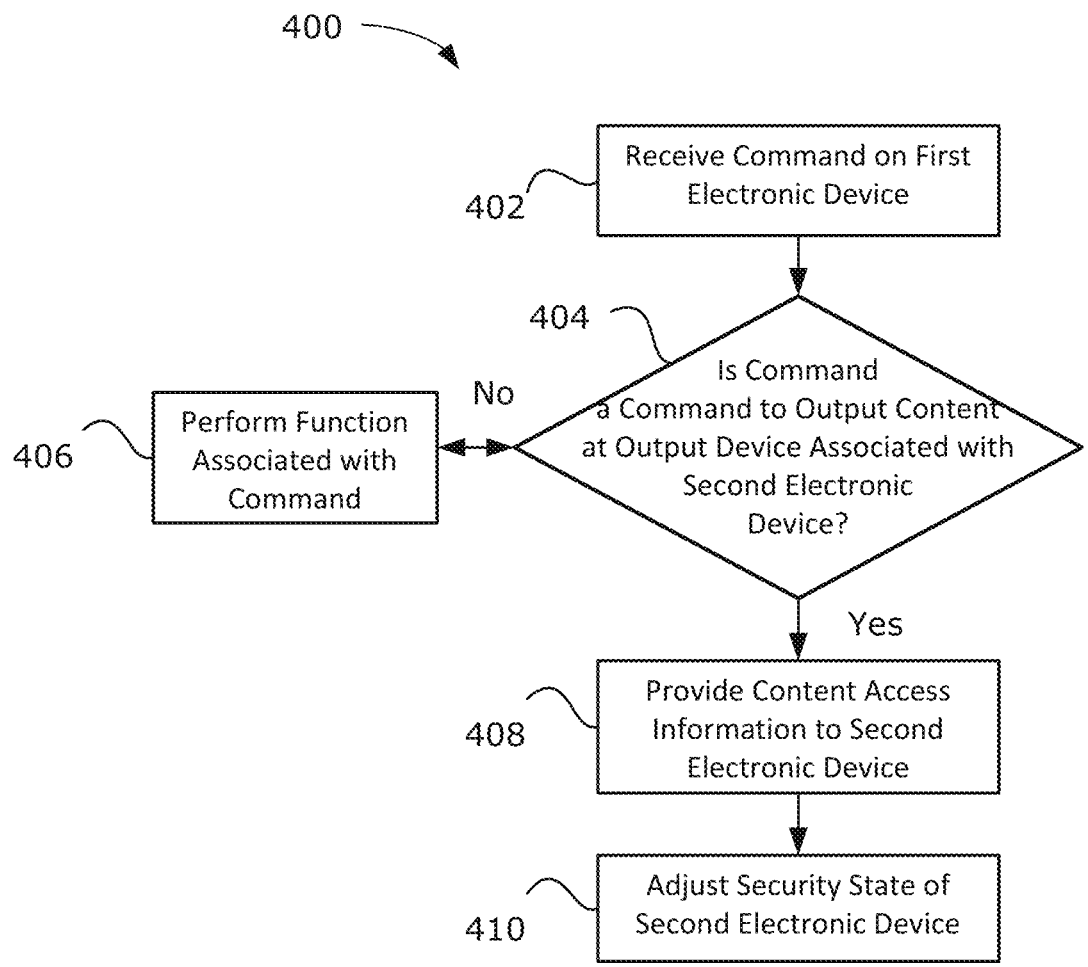
FIG. 4 is flowchart of a method for distributing content to an electronic device in accordance with example embodiments of the present disclosure.

Reference will now be made to FIG. 4 which illustrates an example method 400 for distributing content to a second electronic device 104 from a first electronic device 102. The method 400 includes features which may be provided by a first electronic device 102, such as the mobile communication device 201 of FIG. 2. More particularly, one or more applications or modules associated with the first electronic device 102, such as the content sharing module 297 (of FIG. 2), may contain processor readable instructions for causing a processor associated with the first electronic device 102 to perform the method 400 of FIG. 4. That is, in at least some example embodiments, the first electronic device 102 is configured to perform the method 400 of FIG. 4.

In at least some example embodiments, one or more of the features of the method 400 of FIG. 4 may be provided, in whole or in part, by another system, software application, module, or device apart from those specifically listed above. For example, in at least some example embodiments, one or more of the features of the method 400 may be performed, at least in part, by the second electronic device 104 (of FIG. 3).

At 402, a command may be received on the first electronic device 102. In at least some example embodiments, the command may be received via one or more input interfaces 206 (of FIG. 2). For example, the command may be received via a keyboard, control button, microphone, touch sensitive overlay, or another input interface. In at least some example embodiments, the command may be a command to output content at an output device 310 (of FIG. 3) associated with a second electronic device 104 (of FIG. 3).

At 404, the first electronic device 102 determines whether the command is a command to output content at an output device 310 (of FIG. 3) associated with the second electronic device 104. For example, the first electronic device 102 determines whether the received input corresponds to a predetermined type of input. By way of example, in some example embodiments a command to output content at an output device 310 associated with the second electronic device 104 may be input into the first electronic device 102 by selecting a specific selectable interface element, such as an icon, or button, which is displayed on a display of the first electronic device 102. That is, a user may use an input interface to select such an interface element and to command the first electronic device 102 to output content at an output device 310 associated with the second electronic device 104.

In other example embodiments, the input which is associated with a command to output content at an output device associated with the second electronic device 104 may be an input of another type. For example, in at least some example embodiments, the input may correspond to a predetermined gesture. The gesture-based input may, for example, be input onto a touch screen display associated with the first electronic device 102. In other example embodiments, the gesture-based input may be sensed by another sensor associated with the first electronic device 102. For example, in some example embodiments the predetermined gesture may require movement of the first electronic device 102. For example, a movement sensor on the first electronic device 102, such as an accelerometer, may be used to detect movement of the first electronic device 102.

In at least some example embodiments, movement of the first electronic device 102 in a predetermined pattern may be interpreted by the first electronic device 102 as a command to output content at an output device associated with the second electronic device 104. That is, at 404 of FIG. 4, the first electronic device 102 may determine whether movement of the first electronic device 102 corresponds to movement which is associated with a command to output content at an output device associated with the second electronic device 104.

In other example embodiments, the command to output content at an output device associated with the second electronic device 104 may be received at the first electronic device 102 via a near field communication (NFC) sensor. For example, in some example embodiments, if a near field communication sensor on the first electronic device 102 and a near field communication sensor on the second electronic device 104 are placed with in close proximity to one another, then the first electronic device 102 may determine that a command to output content at an output device associated with the second electronic device 104 has been received at the first electronic device 102.

If, at 404, the first electronic device 102 determines that the command which was received at the first electronic device 102 at 402 was not a command to output content at an output device 310 associated with the second electronic device 104, then at 406, the first electronic device 102 may perform a function which is associated with the received command.

If, however, the first electronic device 102 determines, at 404, that a command to output content at an output device associated with a second electronic device 104 was received at 402, then at 408 the first electronic device 102 may provide content access information to the second electronic device 104. That is, at 408, the first electronic device 102 may effectively instruct the second electronic device 104 to output the content at an output device 310 (of FIG. 3) associated with the second electronic device 104. The content access information, which is sent from the first electronic device 102 to the second electronic device 104 at 408 informs the second electronic device 104 of the specific content which is to be output from the second electronic device 104. In some example embodiments, the content access information which is sent from the first electronic device 102 to the second electronic device 104 may include the content itself. That is, the first electronic device 102 may send the second electronic device 104 the specific content which is to be output from the output device 310 associated with the second electronic device 104. The content may, for example, be sent in the form of one or more files.

In other example embodiments, the first electronic device 102 may not send the content itself to the second electronic device 104. Instead, the first electronic device 102 may send content access information which includes a reference to the content. The reference allows the second electronic device 104 to then retrieve the content. For example, the reference may be a link, pointer, or other identifier which allows the second electronic device 104 to identify and retrieve the content. By way of example, in some example embodiments, the reference may be in the form of a Uniform Resource Locator (URL). In at least some example embodiments, the reference may be an address which is associated with the content. That is, the reference may identify a location on storage, such as a memory, which is accessible to the second electronic device 104. For example, the reference may identify a location in local memory 350 of the second electronic device 104 where the content is stored. In other example embodiments, the reference may identify a location on a remote server, such as a web server, where the content is stored. The reference allows the second electronic device 104 to retrieve the content so that the second electronic device 104 may output the content to the output device 310 associated with the second electronic device 104. In at least example embodiments, such retrieval may be performed automatically by the second electronic device 104 in response to receiving the reference.

The content may be any type of digital content. By way of example, in some example embodiments, the content may be an electronic message, a webpage, an electronic document containing text, audio, video, an image, or an email attachment. In at least some example embodiments, the content may be a word processing document such as a Microsoft Word™ document. In other example embodiments, the content may be a movie or a television show or another type of video. In other example embodiments, the content may be a song or other musical composition or audio based file. Other types of content apart from those specifically discussed herein may also be used in other example embodiments.

Accordingly, at 408, the first electronic device 102 may command the second electronic device 104 to output content at an output device 310 associated with the second electronic device 104. In some example embodiments, this command may be a command to display content at a display associated with the second electronic device 104 (i.e. the output device 310 may include a display). In some example embodiments, this command may include a command to output audio on an audio device, such as a speaker, associated with the second electronic device 104 (i.e. the output device 310 may include an audio device).

At 410, the first electronic device 102 may, in response to receiving a command to output the content at the output device associated with the second electronic device 104, adjust a security state on the second electronic device 104. In at least example embodiments, the security state on the second electronic device 104 may be adjusted automatically without direct instructions to do so from a user. That is, in at least example embodiments, the security state on the second electronic device 104 may be automatically adjusted as a result of the receipt of a command on the first electronic device 102 to output content at an output device 310 associated with the second device 104.

Accordingly, in at least some example embodiments, at 410, the first electronic device 102 may cause the second electronic device 104 to transition from a higher level security state to a lower level security state. In at least some example embodiments, 410 may only occur (i.e. the security state of the second electronic device 104 may only be adjusted) if the second electronic device 104 is operating in a higher level security state. That is, where the second electronic device 104 is already operating in a lower level security state, it may be unnecessary to transition the second electronic device 104 to the lower level security state. Accordingly, in at least some example embodiments, at 410 the first electronic device 102 and/or the second electronic device 104 may determine whether the second electronic device 104 is currently operating in a higher level security state and may only adjust the security state of the second electronic device 104 if the second electronic device 104 is operating in the higher level security state.

In at least some example embodiments, the higher level security state is a device locked state. The device locked state is a state in which one or more features of the second electronic device 104 are disabled and in which authentication information may be input into the second electronic device 104 to transition the second electronic device 104 from the device locked state to a lower level security state, which may be referred to as a device unlocked state. In at least some such example embodiments, at 410, the first electronic device 102 causes the second electronic device 104 to transition from the device locked state to the device unlocked state.

In at least some example embodiments, the first electronic device 102 may specifically instruct the second electronic device 104 to transition to the lower level security state. For example, in some example embodiments, the first electronic device 102 may adjust the security state on the second electronic device 104 by sending authorization information 277 (of FIG. 2) from the first electronic device 102 to the second electronic device 104. The authorization information 277 may be secure information for authorizing the second electronic device 104 to adjust the security state. In at least some example embodiments, the authorization information may be information which is established when a trusted relationship is created between the first electronic device 102 and second electronic device 104. For example, the authorization information may be created during a pairing process, such as the process described below with reference to FIG. 6. In at least some example embodiments in which the first electronic device 102 sends authorization information to the second electronic device 104, the second electronic device 104 is configured to authenticate the authorization information 277. For example, in at least some example embodiments, the second electronic device 104 may compare the received authorization information 277 with authorization information 377 (of FIG. 3) which is stored on the second electronic device 104. In at least some example embodiments, the second electronic device 104 may only transition the second electronic device 104 to the lower level security state if the received authorization information 277 (of FIG. 2) corresponds to the stored authorization information 377 (of FIG. 3).

In other example embodiments, the first electronic device 102 may not specifically instruct the second electronic device 104 to unlock or otherwise transition to a lower level security state. Instead, if a pre-existing trusted relationship exists between the first electronic device 102 and the second electronic device 104, then the second electronic device 104 may automatically transition to the lower level security state upon receiving the content access information provided at 408. That is, the fact that a trusted electronic device has commanded the second electronic device 104 to output the content at its output device 310 (of FIG. 3) may be interpreted as a command to adjust the security state on a second electronic device 104.

In at least some example embodiments, one or more predetermined conditions must exist at the first electronic device 102 and/or the second electronic device 104 before the method 400 may be performed and/or completed. In such example embodiments, the first electronic device 102 and/or the second electronic device 104 may be configured to determine whether such conditions exist before performing the method.

For example, in some example embodiments, the method 400 may be performed in response to receipt of content of a predetermined type. For example, the method 400 may be performed if content is received which the first electronic device 102 determines would be best output to the second electronic device 104. For example, where the first electronic device 102 is a mobile communication device 201 such as a smartphone, the mobile communication device 201 may determine that video content is best viewed from an output device associated with the second electronic device 104. In such example embodiments, when it is determined that content would be better viewed or otherwise output from an output device associated with the second electronic device 104, then the method 400 of FIG. 4 may be performed.

Similarly, in another precondition for the method 400 to operate may require that communications between the first electronic device 102 and the second electronic device 104 be available. For example, the method 400 may not operate where communications are not available between the first electronic device 102 and the second electronic device 104 (i.e. since the electronic devices would be unable to exchange data). Accordingly, in at least some example embodiments, the first electronic device 102 may determine whether communications with the second electronic device 104 are available and may only perform the method 400 if it is determined that such communications are currently available.

Similarly, in at least some example embodiments, communications of a predetermined type must be available before the method 400 will be performed. For example, in order to ensure that the second electronic device 104 is not placed into a lower level security state when an unauthorized user may have access to the second electronic device 104 without supervision from an authorized user, the method 400 may only be performed when short range communications are available. That is, the method 400 may only be performed if the first electronic device 102 and the second electronic device 104 are in range to communicate over a short range connection. The short range connection may, for example, be a Wi-Fi connection, a Bluetooth connection and/or a near field communication (NFC) connection. Other types of short range communications may be used in other example embodiments. Accordingly, in at least some example embodiments, the first electronic device 102 may determine if a short range connection to the second electronic device 104 is available, and may only perform the method 400 of FIG. 4 if the short range connection is available. This ensures that the user of the first electronic device 102 is likely in the vicinity of the second electronic device 104 when the second electronic device 104 is transitioned to the lower level security state.

By way of further example, in some example embodiments, a trusted relationship between the first electronic device 102 and the second electronic device 104 must exist before the method 400 will be performed or before one or more parts of the method 400 will be performed. For example, if a trusted relationship does not exist, then the first electronic device may not be permitted to adjust the security state of the second electronic device 104. That is, if a trusted relationship does not exist, then 410 of FIG. 4 may not be performed. Accordingly, in at least some example embodiments, the first electronic device 102 determines if a trusted relationship exists with the second electronic device 104. In at least some example embodiments, one or more features of the method 400 of FIG. 4 will only be performed if it is determined that a trusted relationship exists between the first electronic device 102 and the second electronic device 104.

Method of Receiving Distributed Content

Figure 5:
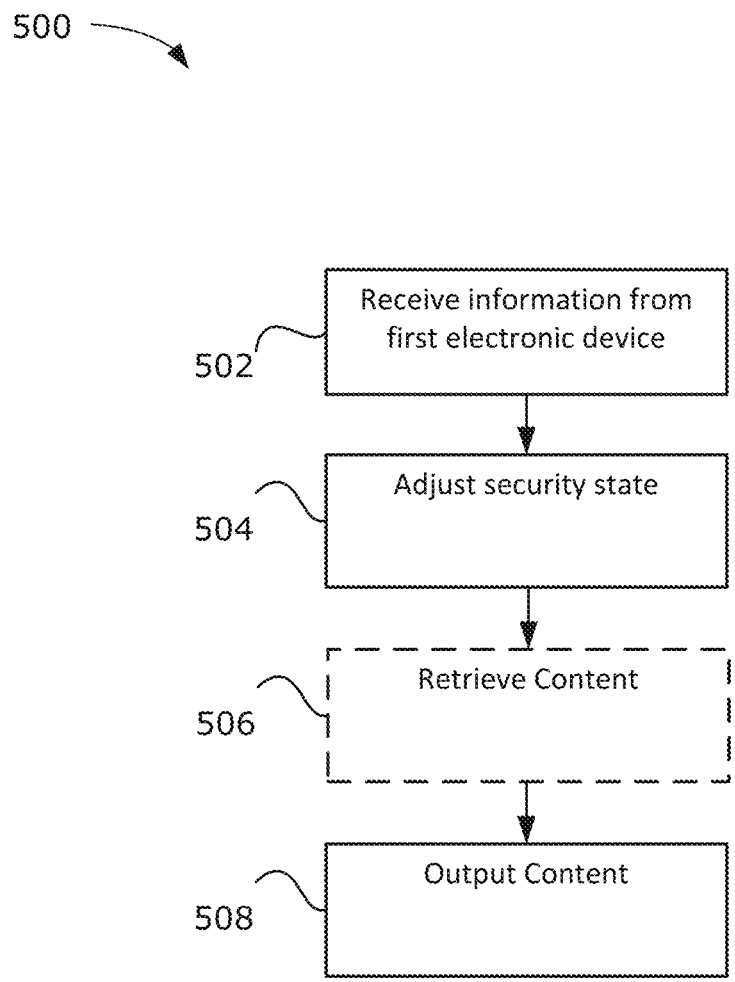
FIG. 5 is a flowchart of a method for receiving distributed content in accordance with example embodiments of the present disclosure.

Reference will now be made to FIG. 5 which illustrates an example method of receiving distributed content from a first electronic device 102. A method 500 includes features which may be performed by the second electronic device 104 (of FIG. 3). More particularly, one or more applications or modules associated with the second electronic device 104, such as the content sharing module 397 may contain processor readable instructions for causing a processor associated with the second electronic device 104 to perform the method 500 of FIG. 5. That is, in at least some example embodiments, the second electronic device 104 is configured to perform the method 500 of FIG. 5. While the method 500 may be performed by the content sharing module 397 in some example embodiments, in other example embodiments, another software application or module may be configured to perform the method 500 of FIG. 5. That is, any one or more of the features of the method 500 of FIG. 5 may, in at least some example embodiments, be provided by other systems, software applications, devices, or modules apart from those specifically discussed herein.

The method 500 for receiving distributed content which is illustrated in FIG. 5 is shown in flowchart form. At 502, the second electronic device 104 receives information, sent from a first electronic device 102, for outputting the content at an output device 310 associated with the second electronic device 104. The information includes content access information which identifies, locates, links to, points to, and/or defines content. Accordingly, the information received at 502 may be the information which is sent at 408 of FIG. 4. Thus, the information received at 502 of FIG. 5 may have the features and characteristics of the content access information 273 (of FIG. 2) described above with reference to 408 of FIG. 4. For example, the content access information received at 502 may include a reference to the content which is to be output on an output device 310 associated with the second electronic device 104. The reference may, for example, be a link, pointer, address, or other identifier associated with the content. The reference may allow the second electronic device 104 to locate, identify, and/or retrieve the content.

As described in greater detail above with reference to FIGS. 2 and 4, the content to access information 273 may include the content itself. That is the content access information may define the content which is to be output on an output device 310 associated with the second electronic device 104. By way of example, in some example embodiments, the content may be streamed from the first electronic device 102 to the second electronic device 104.

At 502, the second electronic device 104 may determine if the received information is of a predetermined form or type which is associated with a command to output content at an output device 310 associated with the second electronic device 104. That is, the second electronic device 104 may attempt to determine whether the received information acts as a command to output content through an output device 310 associated with the second electronic device 104.

In at least some example embodiments, the information received at 502 may also include additional information which may be used by the second electronic device 104 to transition the second electronic device 104 to a lower level security state. For example, the information may include a command to adjust the security state on the second electronic device 104. In some example embodiments, the information may include authorization information 277. The authorization information is secure information for authorizing a second electronic device 104 to adjust the security state.

In at least some example embodiments, in response to receiving the information sent from the first electronic device 102, the second electronic device 104 may, at 504, adjust a security state on the second electronic device 104. In at least some example embodiments, at 504, the second electronic device 104 may transition the second electronic device 104 from a higher level security state, such as a device locked state, to a lower level security state, such as a device unlocked state. As noted previously, a device locked state is a state in which one or more features of the second electronic device 104 are disabled and in which authentication information may be input into the second electronic device 104 to transition the second electronic device 104 from the device locked state to the device unlocked state. Accordingly, in at least some example embodiments, when the first electronic device 102 effectively commands the second electronic device 104 to output content at an output device 310 associated with the second electronic device 104 (i.e. at 502), then the security state of the second electronic device 104 may be automatically adjusted if the second electronic device 104 is currently operating in a higher level security state. That is, the security state on the second electronic device 104 may be adjusted without direct input from a user to do so. For example, when the second electronic device 104 is in a device locked state a user may not be required to input their password or other authentication information using an input device associated with the second electronic device 104. Instead, the second electronic device 104 may be automatically unlocked.

In at least some example embodiments, before the security state of the second electronic device 104 is adjusted at 504, one or more predetermined conditions must exist. For example, in at least some example embodiments, the security state is only adjusted if the second electronic device 104 is currently operating in a higher level security state. That is, if the second electronic device 104 is currently operating in a lower level security state, then security state may not be adjusted. In at least some such example embodiments, prior to adjusting the security state, the second electronic device 104 may determine whether the second electronic device 104 is operating in the higher level security state.

Similarly, in at least some example embodiments, the security state of the second electronic device 104 will only be adjusted if the information received at 502 was received from an electronic device which is considered by the second electronic device 104 to be a trusted electronic device. For example, in some example embodiments, the security state may only be adjusted if the first electronic device 102 which sent the information and the second electronic device 104 have a pre-existing trusted relationship. In at least some example embodiments, the second electronic device 104 may determine if the electronic device from which the information was received at 502 is a trusted electronic device and may only adjust the security state if the electronic device is determined to be trusted. That is, if no pre-existing trusted relationship exists, then the second electronic device 104 may not adjust the security state. More particularly, the security state may be adjusted if the first electronic device 102 and the second electronic device 104 have a trusted relationship but may not be adjusted if the first electronic device 102 and the second electronic device 104 do not have a trusted relationship.

In at least some example embodiments, the first electronic device 102 and the second electronic device 104 may only be able to communicate if they have a trusted relationship. That is, in at least some example embodiments, the fact that the first electronic device 102 was able to communicate with the second electronic device 104 (i.e. was able to send the information which was received at 502) may be indicative of the fact that a pre-existing trusted relationship exists. That is, the second electronic device 104 may determine that the first electronic device 102 is a trusted electronic device and is therefore able to adjust the security state of the second electronic device 104 if the first electronic device 102 was able to connect to the second electronic device 104 to send the information.

In other example embodiments, in order to unlock or otherwise adjust the security state of the second electronic device 104, the first electronic device 102 may be required to provide authorization information 277 (of FIG. 2). The authorization information 277 may, for example, be special information which is used by the first electronic device 102 in order to unlock the second electronic device 104. Accordingly, in at least some example embodiments, the information received at 502 may include the authorization information 277. In such example embodiments, before adjusting the security state at 504, the second electronic device 104 may determine if the received authorization information 277 is valid. That is, the second electronic device 104 may attempt to authenticate the authorization information 277. By way of example, in at least some example embodiments, the second electronic device 104 may compare the received authorization information 277 to authorization information 377 which is stored on the second electronic device 104. If the received authorization information 104 is determined to correspond to the stored authorization information 377, then the second electronic device 104 may cause the second electronic device 104 to transition to a lower level security state.

In at least some example embodiments, another precondition which must exist before the security state of the second electronic device 104 will be adjusted may require that the first electronic device 102 and the second electronic device 104 be communicating over a short range connections. That is, to provide greater security, the second electronic device 104 may not switch security states if the first electronic device 102 and the second electronic device 104 are connected over a long range connection. By way of example, in at least some example embodiments, the second electronic device 104 may transition its security state if it is connected to the first electronic device 102 via a Wi-Fi connection, and/or a Bluetooth connection, and/or a Near Field Communication (NFC) connection. However, in at least some example embodiments, the security state may not be adjusted if the first electronic device 102 is connected to the second electronic device 104 via a communication method or protocol which may be a long range connection method. For example, in at least some example embodiments, the security state may not be transitioned to the lower level security state if the electronic devices are connected over the Internet. By requiring a short range connection to unlock the second electronic device 104, greater security may be provided. That is, the use of a short range connection may better ensure that unauthorized users do not access the second electronic device 104. Accordingly, in at least some example embodiments, prior to adjusting the security state at 504, the second electronic device 104 may determine the type of connection between the first electronic device 102 and the second electronic device 104. That is, in at least some example embodiments, the second electronic device 104 may attempt to determine whether the first electronic device 102 is situated in close proximity to the second electronic device and may only adjust the security state if the electronic devices are determined to be in close proximity to one another.

Referring still to FIG. 5, in at least some example embodiments, at 506, the second electronic device 104 may automatically retrieve the content. For example, where the information received at 502 included a reference to the content (i.e. such as a locator, address, link, pointer or other identifier) then the second electronic device 104 may use the reference to locate, identify, and/or retrieve the content. By way of example, in some example embodiments, the reference may be in the form of a link such as a Uniform Resource Locator (URL). In such example embodiments, the second electronic device 104 may use the URL to access one or more remote servers and to retrieve the content. Retrieving the content may include, for example, downloading the content to the second electronic device 104 and/or streaming the content to the second electronic device 104.

In at least some example embodiments, it may not be necessary at 506 to retrieve the content. For example, in at least some example embodiments, the information which is received at 502 may define the content itself. That is, the first electronic device 102 may send the second electronic device 104 the content. Accordingly, in at least some example embodiments, 506 may not be performed.

At 508, in response to receiving the information sent from the first electronic device 102 at 502, the second electronic device 104 may output the content at an output device 310 associated with the second electronic device 104. For example, in at least some example embodiments, the second electronic device 104 may display content at a display associated with the second electronic device 104. For example, where the content is an electronic document, such as a webpage, or a word processing document, or other document, the document may be displayed on a display. Similarly, where the content is an audio file, the content may be output through a speaker. In at least some example embodiments, at 508, the content may be output to two or more output devices 310. For example, where the content is a video, a visual component of the video may be displayed on a display and an audible component of the video may be output through a speaker.

The second electronic device 104 may be configured to handle different types of content in different manners. Accordingly, in at least some example embodiments, the second electronic device 104 may determine the type of the content before outputting the content at 508. Based on the type of the content, the second electronic device 104 may determine how to handle the content.

In some example embodiments, prior to outputting the content, the second electronic device 104 may launch an application which is equipped to handle the content. For example, based on the type of the content, the second electronic device 104 may open the content in an appropriate application. For example, if the content is a video, the second electronic device 104 may launch a video player and may open the video in the video player and begin playback of the video through the video player. Similarly, where the content is audio, the second electronic device 104 may launch an audio player and may begin playback of the audio through an associated audio application.

In at least some example embodiments, one or more predetermined conditions must exist before the content will be output at 508. In at least some example embodiments, the content will only output if one or more of the predetermined conditions discussed above with reference to 504 exist. For example, in at least some example embodiments, the first electronic device 102 and the second electronic device 104 must have a trusted relationship before the content will be output on the second electronic device 104. Similarly, in at least some example embodiments, the first electronic device 102 and the second electronic device 104 must be located in close proximity to one another before the content will be output at 508. Accordingly, in at least some example embodiments, at 508, the second electronic device 104 may determine whether one or more predetermined conditions exist and may only output the content at the output device 310 if those predetermined conditions are found to exist.

Example Method of Establishing Trusted Relationship

As noted previously, one or more of the features of the methods 400, 500 of FIGS. 4 and 5 may only be performed if the first electronic device 102 and the second electronic device 104 have a pre-existing trusted relationship. That is, if no trusted relationship exists between the first electronic device 102 and the second electronic device 104, then one or more of the features of the methods 400, 500 of FIG. 4 and/or FIG. 5 may not be performed. For example, in at least some example embodiments, the security state of the second electronic device 104 may not be adjusted by the first electronic device 102 unless a pre-existing trusted relationship exists between the first electronic device 102 and the second electronic device 104. Thus, in at least some example embodiments, the first electronic device 102 and the second electronic device 104 are configured to allow trusted relationships to be established with other electronic devices.

Figure 6:
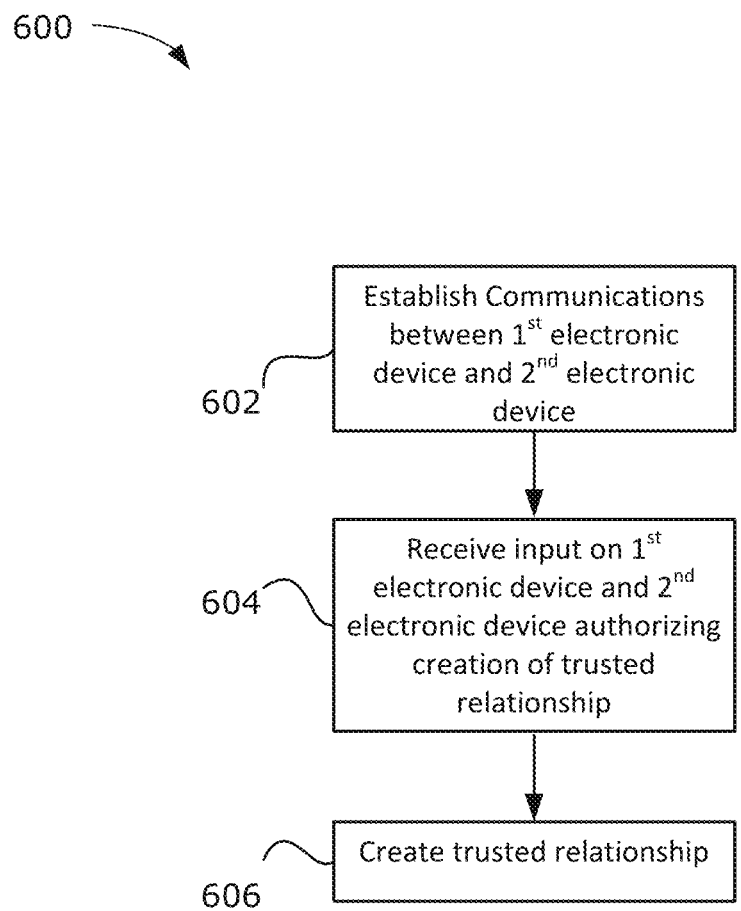
FIG. 6 is a flowchart of a method for establishing a trusted relationship between a first electronic device and a second electronic device in accordance with example embodiments of the present disclosure.

Reference will now be made to FIG. 6 which illustrates an example method 600 for establishing a trusted relationship between a first electronic device 102 and second electronic device 104. The method 600 includes features which may be performed by one or more electronic devices. That is, the first electronic device 102 and the second electronic device 104 may collectively perform the method 600. Accordingly, the method 600 may be performed by each of the first electronic device 102 and the second electronic device 104 in order to establish a trusted relationship between those electronic devices. One or more applications or modules, such as the pairing module 298, 398 of the first electronic device 102 and the second electronic device 104 may contain processor readable instructions for causing a processor associated with the first electronic device 102 and the second electronic device 104 to perform the method 600 of FIG. 6. Any one or more of the features of the method 600 of FIG. 6 may, in at least some example embodiments, be provided by other systems, software applications, devices, or modules apart from those specifically discussed herein.

First at 602, communications are established between the first electronic device 102 and second electronic device 104. The communication permits the first electronic device 102 and the second electronic device 104 to exchange data. By way of example, in at least some example embodiments, the communications may be Bluetooth communications or of another type of short range technology. By way of further example, in other example embodiments, the communications may be Wi-Fi communications. It will be appreciated that the communications may be of a form not specifically mentioned herein.

At 604, user input may be received at the first electronic device 102 and also at the second electronic device 104. The user input which is received authorizes the creation of a trusted relationship between the electronic devices. That is, users of both electronic devices may, in some manner, be required to confirm that they would like a trusted relationship to exist between the electronic devices.

At 606, after the creation of a trusted relationship has been authorized, a trusted relationship may be created between the first electronic device 102 and the second electronic device 104. In at least some example embodiments, at 606, trusted relationship information 275, 375 may be stored on one or both of the electronic devices. The trusted relationship information tracks the relationship between the first electronic device 102 and the second electronic device 104 and allows the electronic devices to subsequently remember the trusted nature of their relationship. That is, once the trusted relationship is established it may be remembered so that it may not need to be established again in the future between those same devices. The trusted relationship information may, for example, include identification information which allows the electronic devices to identify one another.

In at least some example embodiments, authorization information 277, 377 may also be created as part of the method 600 of FIG. 6. The authorization information 277 may be used by the electronic devices when highly secure commands are sent from one electronic device to another electronic device. For example, in at least some example embodiments, when the first electronic device 102 wishes to unlock or otherwise transition a security state on the second electronic device 104 then the first electronic device 102 may be required to provide the authorization information 277 to the second electronic device 104. The second electronic device 104 may use its own authorization information 377 to authenticate the received authorization information 277.

While the example embodiment discussed with reference to FIG. 6 requires user input on both electronic devices to establish the trusted relationship, in at least some example embodiments, a trusted relationship may be established through input on only the second electronic device 104. For example, if a user of the second electronic device 104 instructs the second electronic device 104 to accept instructions and commands from the first electronic device 102 and to make the first electronic device 102 a trusted electronic device, then the first electronic device 102 may become a trusted device for the second electronic device 104 and may be permitted to adjust the security state on the second electronic device 104.

Method for Distributing Content to a Second Electronic Device

Figure 7:
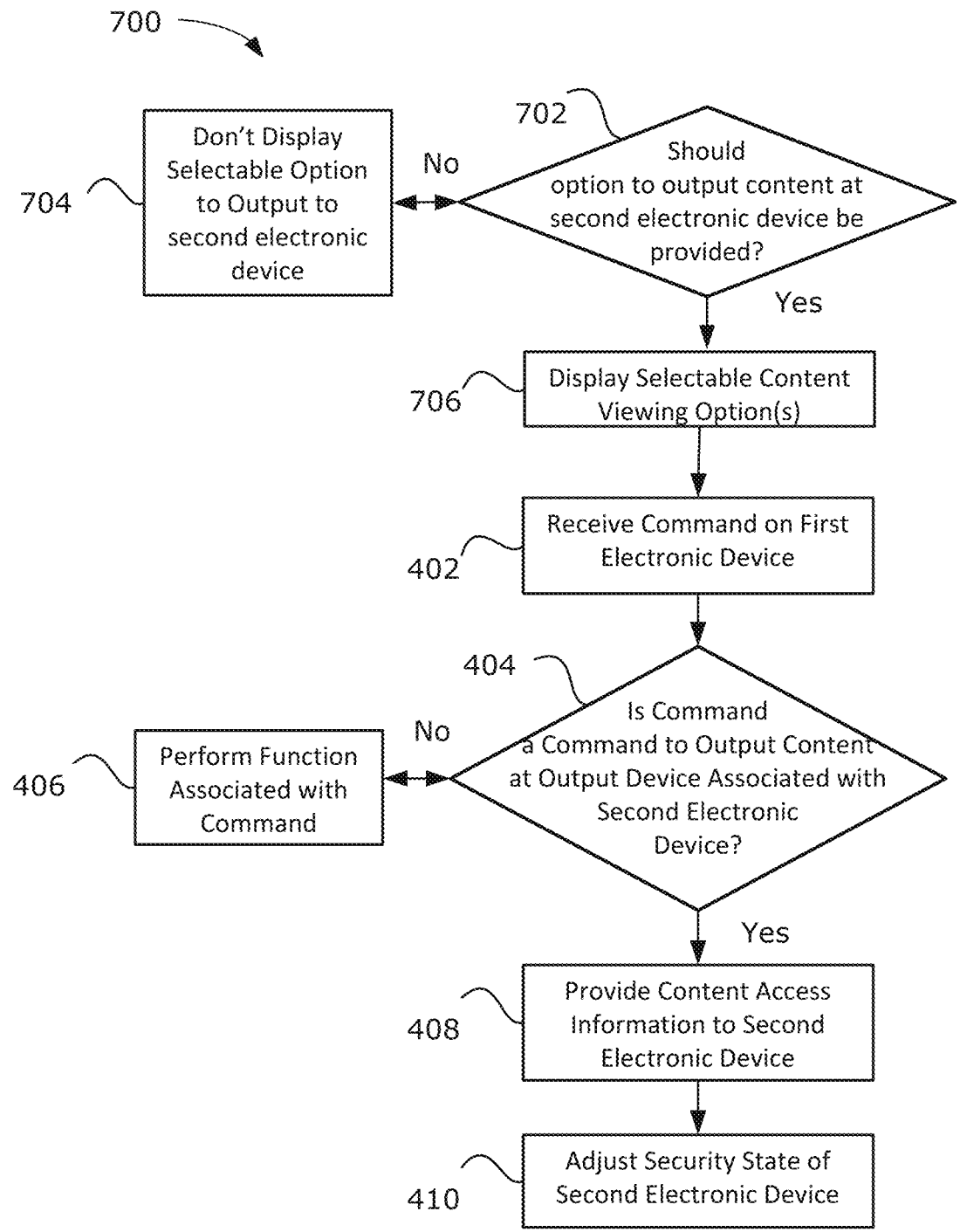
FIG. 7 is a flowchart of a method for distributing content to an electronic device in accordance with example embodiments of the present disclosure.

Reference will now be made to FIG. 7 which illustrates an example method 700 for distributing content to a second electronic device 104. The method 700 is illustrated in flowchart form. The method 700 includes features which may be performed by the first electronic device 102. More particularly, one or more applications or module, such as the content sharing module 297 may contain processor readable instructions for causing a processor associated with the first electronic device 102 to perform the method 700 of FIG. 7. Any one or more of the features of the method 700 may, in at least some example embodiments, be provided by other systems, software applications, devices, or modules apart from those specifically discussed herein.

The method 700 includes a number of features which are discussed above with reference to FIG. 4.

At 702, the first electronic device 102 determines whether an option to output content at the second electronic device 104 should be provided. More particularly, the first electronic device 102 may determine, based on one or more predetermined rules, whether such as option should be provided. That is, one or more predetermined rules are used to determine whether a user should be permitted to input an instruction to the first electronic device 102 to output content at an output device 310 associated with a second electronic device 104.

In at least some example embodiments, one of the predetermined rules may specify one or more content types which are either suitable or not suitable for being an output to the second electronic device 104. By way of example, the predetermined rules may take the form of a white list. A white list, which may also be referred to as an approved list, is a list of content types which are being provided with a particular privilege. In this case, the white list specifies types of content which are suitable and/or preferred for outputting on an output device 310 associated with the second electronic device 104. For example, the white list may specify content types which the second electronic device 104 is equipped to handle. For example, the white list may specify content types which have an associated application on the second electronic device 104. Accordingly, in at least some example embodiments, at 702, the first electronic device 102 may determine the content type of content and may determine whether the option to output content at an output device 310 associated with the second electronic device 104 should be provided based on the content type of the content and the one or more content types specified by the predetermined rules (for example, the content types in the white list).

In other example embodiments, the one or more predetermined rules may take the form of a black list. The black list may specify one or more content type which are not suited for output to the second electronic device 104. That is, the black list may specify one or more content types for which an option to output the content at the second electronic device 104 should not be provided. In such example embodiments, at 702, the first electronic device 102 may determine the content type of the content and may determine whether that content type is a type which is included in the black list. If so, then the option to output content at the second electronic device 104 may not be provided.

Similarly, in at least some example embodiments, one or more of the predetermined rules which are used in order to determine whether the option to output content at the second electronic device 104 should be provided may specify that the option should only be presented if the first electronic device 102 and second electronic device 104 are in range to communicate over a short range connection. For example, in order to ensure that an unauthorized user does not gain access to the second electronic device 104, the option may only be presented on the first electronic device 102 if the first electronic device 102 and the second electronic device 104 are in close proximity to one another. The first electronic device 102 and the second electronic device 104 may be determined to be in close proximity to one another if a short range communication connection is available between them. Accordingly, in at least some example embodiments, at 702, the first electronic device 102 may determine whether one or more predetermined connection types are available and may only determine that an option to output content at the second electronic device 104 should be presented if such a connection is available.

Similarly, in at least some example embodiments, a predetermined rule which is used at 702 to determine whether an option to output the content the second electronic device 104 should be provided may require that the first electronic device 102 be able to communicate with the second electronic device 104. That is, if no communications are available between the first electronic device 102 and the second electronic device 104, then the first electronic device 102 may determine that the option to output content at the second electronic device 104 should not be provided.

If, at 702, the first electronic device 102 determines that the option to output content at the second electronic device 104 should be provided then, at 704, the first electronic device 102 may not display a selectable option to output the content at the second electronic device 104. Instead, if it is determined that the option to output content at the second electronic device 104 should not be provided, then the first electronic device 102 may perform another function. For example, in at least some example embodiments, the first electronic device 102 may automatically output the content at an output device associated with the first electronic device 102. In other example embodiments, the first electronic device 102 may provide a user with a selectable option to output the content at an output device associated with the first electronic device 102. That is, a user may be permitted to display or otherwise output the content locally using one or more output interfaces associated with the first electronic device 102.

If, however, the first electronic device 102 determines that an option to output content at the second electronic device 104 should be provided, then at 706 the first electronic device 102 may display one or more selectable viewing options on the first electronic device 102. That is, one or more selectable content viewing options may be displayed on a display associated with the first electronic device 102. The one or more selectable content viewing options may include a selectable option to output the content at an output device associated with the second electronic device 104. The selectable option may, for example, be a button, link, or other interface element which a user may select by interacting with an input device associated with the first electronic device 102. The selectable option to output the content at an output device associated with the second electronic device 104 may be used by a user to command the first electronic device 102 to output content at an output device associated with the second electronic device 104.

The selectable option to output the content at an output device associated with the second electronic device 104 may be displayed, at 706, together with a selectable option to output the content at an output device associated with the first electronic device (e.g. the display 204 (of FIG. 2)).

After the selectable options are displayed at 706, the features of FIG. 4 may be performed. That is, following 706, the method 400 of FIG. 4 may be performed. The functions and features of the method 400 of FIG. 4 are described in greater detail above. Accordingly, features 404, 406, 408 and 410 of FIG. 7 may function in the manner described above with reference to FIG. 4.

While the present application is primarily described in terms of methods, a person of ordinary skill in the art will understand that the present application is also directed to various apparatus such as a handheld electronic device and a server. The handheld electronic device and the server includes components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method performed by a processor, comprising:
    determining, based on one or more rules specifying one or more content types, that a selectable option is to be provided on a first electronic device to output content at an output device associated with a second electronic device, wherein the selectable option is to be provided based on a content type of the content and the one or more content types specified in the one or more rules;
    receiving a command, via the selectable option, to output content at the output device associated with the second electronic device; and
    in response to receiving the command to output content at the output device associated with the second electronic device, providing content access information from the first electronic device to the second electronic device.

2. The method of claim 1, wherein the one or more rules include a white list specifying one or more content types suited for output on the output device associated with the second electronic device.

3. The method of claim 1, wherein the one or more rules include a black list specifying one or more content types not suited for output on the output device associated with the second electronic device.

4. The method of claim 1, wherein at least one of the rules specifies that the selectable option is not to be provided if the first electronic device and the second electronic device are not in range to communicate over a short range connection.

5. The method of claim 1, wherein at least one of the rules specifies that the selectable option is not to be provided if communications between the first electronic device and the second electronic device are unavailable.

6. A method performed by a processor, the method comprising:
    receiving a command on a first electronic device to output content at an output device associated with a second electronic device; and
    in response to receiving the command to output content at the output device associated with the second electronic device:
    providing content access information from the first electronic device to the second electronic device; and
    causing the second electronic device to transition from a higher level security state to a lower level security state.

7. The method of claim 6, wherein the higher level security state is a device locked state and the lower level security state is a device unlocked state, and wherein the device locked state is a state in which one or more features of the second electronic device are disabled and in which authentication information may be input into the second electronic device to transition the second electronic device from the device locked state to the device unlocked state.

8. An electronic device comprising:
    a communication subsystem for communicating with a second electronic device;
    a processor; and
    a memory containing processor readable instructions for causing the processor to:
    determine, based on one or more rules specifying one or more content types, that a selectable option is to be provided on the electronic device to output content at an output device associated with a second electronic device, wherein the selectable option is to be provided based on a content type of the content and the one or more content types specified in the one or more rules;
    receive a command, via the selectable option, to output content at the output device associated with the second electronic device; and in response to receiving the command to output content at the output device associated with the second electronic device, provide content access information from the electronic device to the second electronic device.

9. The electronic device of claim 8, wherein the one or more rules includes a white list specifying one or more content types suited for output on the output device associated with the second electronic device.

10. The electronic device of claim 8, wherein the one or more rules includes a black list specifying one or more content types not suited for output on the output device associated with the second electronic device.

11. The electronic device of claim 8, wherein at least one of the rules specifies that the selectable option is not to be provided if the electronic device and the second electronic device are not in range to communicate over a short range connection.

12. The electronic device of claim 8, wherein at least one of the rules specifies that the selectable option is not to be provided if communications between the electronic device and the second electronic device are unavailable.

13. A first electronic device comprising:
a communication subsystem for communicating with a second electronic device;
a processor; and
a memory containing processor readable instructions for causing the processor to:
receive a command on the first electronic device to output content at an output device associated with a second electronic device; and
in response to receiving the command to output content at the output device associated with the second electronic device:
provide content access information from the first electronic device to the second electronic device; and
cause the second electronic device to transition from a higher level security state to a lower level security state.

14. The first electronic device of claim 13, wherein the higher level security state is a device locked state and the lower level security state is a device unlocked state, and wherein the device locked state is a state in which one or more features of the second electronic device are disabled and in which authentication information may be input into the second electronic device to transition the second electronic device from the device locked state to the device unlocked state.

15. A non-transitory computer readable medium comprising instructions which, when executed, cause a processor to:
determine, based on one or more rules specifying one or more content types, that a selectable option is to be provided on a first electronic device to output content at an output device associated with a second electronic device, wherein the selectable option is to be provided based on a content type of the content and the one or more content types specified in the one or more rules;
receive a command, via the selectable option, to output content at the output device associated with the second electronic device; and
in response to receiving the command to output content at the output device associated with the second electronic device, provide content access information from the first electronic device to the second electronic device.

16. The non-transitory computer readable medium of claim 15, wherein at least one of the rules specifies that the selectable option is not to be provided if the first electronic device and the second electronic device are not in range to communicate over a short range connection.

17. A non-transitory computer readable medium comprising instructions which, when executed, cause a processor to:
receive a command on a first electronic device to output content at an output device associated with a second electronic device; and
in response to receiving the command to output content at the output device associated with the second electronic device:
provide content access information from the first electronic device to the second electronic device; and
cause the second electronic device to transition from a higher level security state to a lower level security state.

* * * * *